United States Patent
Fukuda

(10) Patent No.: US 8,984,334 B2
(45) Date of Patent: *Mar. 17, 2015

(54) PROCESSOR AND METHOD OF CONTROLLING EXECUTION OF PROCESSES

(71) Applicant: Kazuhisa Fukuda, Kanagawa (JP)

(72) Inventor: Kazuhisa Fukuda, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 44 days.

This patent is subject to a terminal disclaimer.

(21) Appl. No.: 13/631,272

(22) Filed: Sep. 28, 2012

(65) Prior Publication Data

US 2013/0024724 A1 Jan. 24, 2013

Related U.S. Application Data

(63) Continuation of application No. 11/474,948, filed on Jun. 27, 2006, now Pat. No. 8,296,602.

(30) Foreign Application Priority Data

Jun. 28, 2005 (JP) .................. 2005-187641

(51) Int. Cl.
G06F 11/00 (2006.01)
G06F 11/07 (2006.01)
(Continued)

(52) U.S. Cl.
CPC .......... *G06F 11/0793* (2013.01); *G06F 9/4881* (2013.01); *G06F 11/0715* (2013.01); *G06F 11/203* (2013.01); *G06F 11/2035* (2013.01); *G06F 11/2043* (2013.01)
USPC .................. 714/10; 714/2; 714/6.12; 714/11

(58) Field of Classification Search
USPC ........................ 714/10, 2, 6.12, 11
See application file for complete search history.

(56) References Cited

U.S. PATENT DOCUMENTS

| 4,453,210 A | 6/1984 | Suzuki et al. |
| 4,839,895 A | 6/1989 | Makita |

(Continued)

FOREIGN PATENT DOCUMENTS

| JP | 05-100882 A | 4/1993 |
| JP | 06-067916 A | 3/1994 |

(Continued)

OTHER PUBLICATIONS

Office Action mailed on Dec. 29, 2009 for U.S. Appl. No. 11/474,948.

(Continued)

*Primary Examiner* — Loan L. T. Truong
(74) *Attorney, Agent, or Firm* — Sughrue Mion, PLLC

(57) ABSTRACT

A processor includes a plurality of processing sections, each of which executes a predetermined process. A plurality of fault detecting circuits are respectively provided for the plurality of processing sections, to detect a fault in one of the plurality of processing sections as a fault processing section to generate a fault detection signal. A fault monitoring and control section controls a normal processing section as at least one of the plurality of processing sections other than the fault processing section to execute a relieving process in response to the fault detection signal. The relieving process is determined based on a process load of the fault processing section, a process load of the normal processing section, and priority levels of processes to be executed by the fault processing section and the normal processing section.

17 Claims, 11 Drawing Sheets

(51) Int. Cl.
*G06F 9/48* (2006.01)
*G06F 11/20* (2006.01)

(56) References Cited

U.S. PATENT DOCUMENTS

| | | | |
|---|---|---|---|
| 4,914,572 A | 4/1990 | Bitzinger et al. | |
| 5,214,759 A * | 5/1993 | Yamaoka et al. | 709/213 |
| 5,235,700 A | 8/1993 | Alaiwan et al. | |
| 5,369,746 A | 11/1994 | Nakamura et al. | |
| 5,386,544 A * | 1/1995 | Nakamura | 714/15 |
| 5,452,443 A | 9/1995 | Oyamada et al. | |
| 5,513,346 A | 4/1996 | Satagopan et al. | |
| 5,613,071 A | 3/1997 | Rankin et al. | |
| 5,768,560 A | 6/1998 | Lieberman et al. | |
| 5,796,332 A | 8/1998 | Steiert | |
| 5,796,937 A | 8/1998 | Kizuka | |
| 5,805,790 A | 9/1998 | Nota et al. | |
| 5,983,359 A | 11/1999 | Nota et al. | |
| 6,012,004 A | 1/2000 | Sugano et al. | |
| 6,088,770 A | 7/2000 | Tarui et al. | |
| 6,105,146 A | 8/2000 | Tavallaei et al. | |
| 6,148,415 A | 11/2000 | Kobayashi et al. | |
| 6,199,179 B1 | 3/2001 | Kauffman et al. | |
| 6,473,795 B1 | 10/2002 | Danielson et al. | |
| 6,496,940 B1 | 12/2002 | Horst et al. | |
| 6,594,785 B1 * | 7/2003 | Gilbertson et al. | 714/48 |
| 6,662,333 B1 | 12/2003 | Zhang et al. | |
| 6,763,474 B1 * | 7/2004 | Boerstler et al. | 713/400 |
| 6,785,841 B2 * | 8/2004 | Akrout et al. | 714/11 |
| 6,832,298 B2 * | 12/2004 | Fujii et al. | 711/147 |
| 6,865,695 B2 * | 3/2005 | Joyner et al. | 714/43 |
| 6,874,014 B2 * | 3/2005 | Richardson et al. | 709/213 |
| 6,990,605 B2 * | 1/2006 | Noda et al. | 714/6.3 |
| 7,028,218 B2 * | 4/2006 | Schwarm et al. | 714/11 |
| 7,062,674 B2 * | 6/2006 | Takamoto | 714/13 |
| 7,080,230 B2 | 7/2006 | Bennett et al. | |
| 7,117,389 B2 * | 10/2006 | Luick | 714/11 |
| 7,203,862 B2 | 4/2007 | Fujimoto | |
| 7,228,441 B2 | 6/2007 | Fung | |
| 7,240,234 B2 * | 7/2007 | Morita et al. | 714/4.11 |
| 7,366,765 B1 * | 4/2008 | Heideman et al. | 709/209 |
| 7,441,066 B2 | 10/2008 | Bouchier et al. | |
| 7,526,673 B2 * | 4/2009 | Inoue et al. | 714/11 |
| 7,543,305 B2 | 6/2009 | Ward | |
| 7,716,521 B1 * | 5/2010 | Donahue et al. | 714/11 |
| 7,984,363 B2 | 7/2011 | Kushida | |
| 8,423,816 B2 * | 4/2013 | Katano et al. | 714/3 |
| 2001/0056554 A1 * | 12/2001 | Chrabaszcz | 714/13 |
| 2002/0091786 A1 | 7/2002 | Yamaguchi et al. | |
| 2002/0124209 A1 | 9/2002 | Faust et al. | |
| 2002/0133744 A1 * | 9/2002 | Oldfield et al. | 714/11 |
| 2002/0156983 A1 | 10/2002 | Jones et al. | |
| 2002/0194532 A1 * | 12/2002 | Nagasawa | 714/11 |
| 2003/0056155 A1 | 3/2003 | Austen et al. | |
| 2003/0065835 A1 | 4/2003 | Maergner et al. | |
| 2003/0079093 A1 * | 4/2003 | Fujii et al. | 711/147 |
| 2003/0115500 A1 * | 6/2003 | Akrout et al. | 714/10 |
| 2003/0208704 A1 * | 11/2003 | Bartels et al. | 714/11 |
| 2004/0055000 A1 * | 3/2004 | Miyake et al. | 718/105 |
| 2004/0153750 A1 * | 8/2004 | Aino et al. | 714/11 |
| 2004/0168170 A1 | 8/2004 | Miller | |
| 2004/0205413 A1 | 10/2004 | Arbeitman et al. | |
| 2004/0246893 A1 | 12/2004 | Ahrens, Jr. et al. | |
| 2005/0050374 A1 * | 3/2005 | Nakamura et al. | 713/375 |
| 2005/0102558 A1 * | 5/2005 | Tiittanen et al. | 714/11 |
| 2005/0193081 A1 | 9/2005 | Gruber et al. | |
| 2005/0204183 A1 * | 9/2005 | Saika | 714/4 |
| 2005/0228947 A1 * | 10/2005 | Morita et al. | 711/114 |
| 2005/0268156 A1 * | 12/2005 | Mashayekhi et al. | 714/4 |
| 2006/0015773 A1 * | 1/2006 | Singh et al. | 714/13 |
| 2006/0117147 A1 * | 6/2006 | Blinick et al. | 711/145 |
| 2006/0143498 A1 * | 6/2006 | Hatasaki et al. | 714/4 |
| 2006/0150015 A1 * | 7/2006 | Kondajeri et al. | 714/23 |
| 2006/0150186 A1 | 7/2006 | Grayver | |
| 2006/0190760 A1 * | 8/2006 | Saika | 714/4 |
| 2006/0242229 A1 | 10/2006 | Kinsey et al. | |
| 2007/0011495 A1 * | 1/2007 | Armstrong et al. | 714/39 |
| 2012/0072631 A1 | 3/2012 | Chirca et al. | |

FOREIGN PATENT DOCUMENTS

| | | |
|---|---|---|
| JP | 08-020962 A | 1/1996 |
| JP | 10-083257 A | 3/1998 |
| JP | 10-187638 A | 7/1998 |
| JP | 2000-76199 A | 3/2000 |
| JP | 2002-259355 A | 9/2002 |
| JP | 2004-295462 A | 10/2004 |
| WO | 03/102772 A2 | 12/2003 |

OTHER PUBLICATIONS

Office Action mailed on May 13, 2010 for U.S. Appl. No. 11/474,948.
Japanese Office Action issued on Jun. 21, 2010 in corresponding Japanese Application No. 2005-187641.
Japanese Office Action issued on Oct. 13, 2010 in corresponding Japanese Application No. 2005-187641.
Final Office Action mailed on Feb. 22, 2011 for U.S. Appl. No. 11/474,948.
Office Action mailed on Jan. 6, 2012 for U.S. Appl. No. 11/474,948.
Notice of Allowance mailed on Jun. 21, 2012 for U.S. Appl. No. 11/474,948.

* cited by examiner

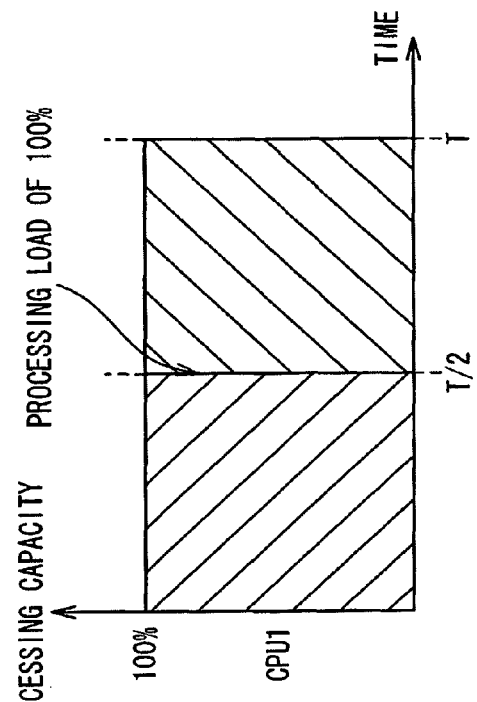
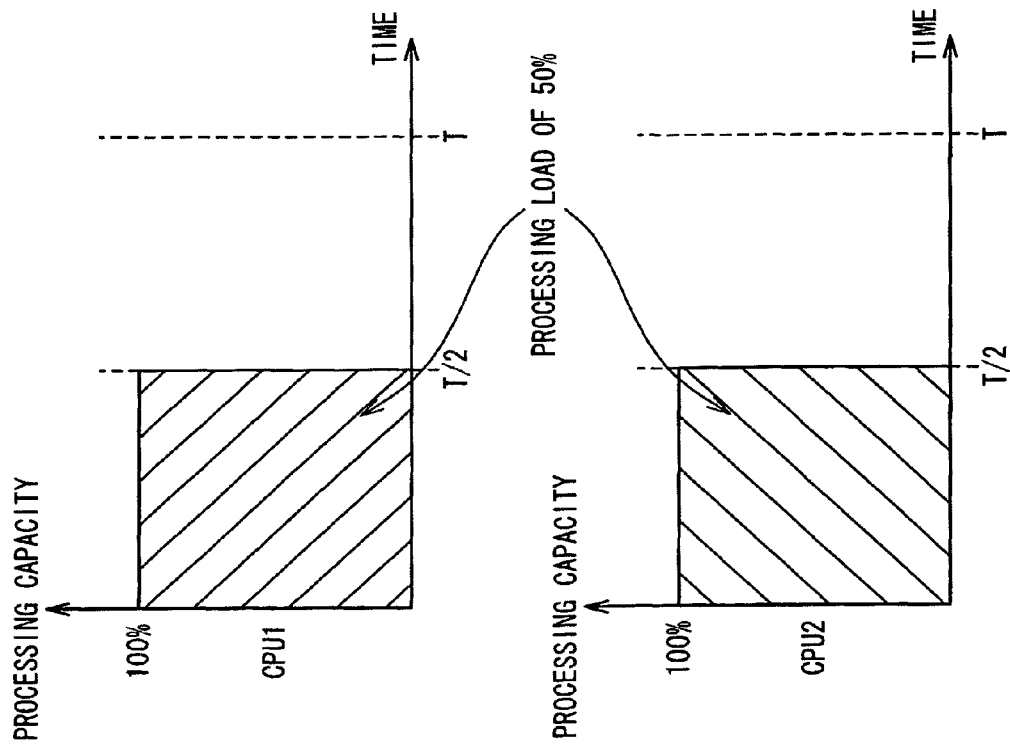

PROCESSOR AND METHOD OF CONTROLLING EXECUTION OF PROCESSES

CROSS-REFERENCE TO RELATED APPLICATION

This application is a continuation application of U.S. application Ser. No. 11/474,948 filed Jun. 27, 2006, which claims priority from Japanese Patent Application No. 2005-187641 filed on Jun. 28, 2005 in the Japanese Patent Office, the disclosures of which are incorporated herein by reference in their entirety.

BACKGROUND OF THE INVENTION

1. Field of the Invention

The present invention relates to a processing technique when a fault has occurred in a processor for executing a plurality of processes at a same time.

2. Description of the Related Art

A processor with a single CPU had been generally used for a control process. However, since the control process becomes higher in level and more complex, the single CPU has become impossible to execute the whole of process. For this reason, a multi-processor system is developed where a plurality of CPUs execute a plurality of processes at a same time. Here, it is supposed that the multi-processor system executes a process A of a process A1 and a process A2. Also, it is supposed that the multi-processor system has a CPU 1 and a CPU 2 and they execute the process A1 and the process A2, respectively. In this case, if the CPU 1 and the CPU 2 can normally execute the processes A1 and A2, the process A is completed without any problem. However, in such a multi-processor system, if one of the plurality of CPUs is inoperable, the entire system is down. For example, when the CPU 1 is in a frozen state or in a fault state in which an indefinite loop is executed, the process A1 to be executed by the CPU 1 is not completed. For this reason, even if the CPU 2 can normally complete the process A2, the process A is not completed. Also, since the process A is not completed, the CPU 2 cannot start a next process even if completing the process A2. In this way, the entire multi-processor processor cannot be normally operated.

The technique related to a multi-processor system is disclosed in Japanese Laid Open Patent Publication (JP-P2000-76199A). In this conventional example, a CPU issues a request signal to an arbitrator circuit. The arbitrator circuit executes a bus arbitration and gives a bus use right (grant signal) to the CPU. When the bus is released, the CPU issues a completion signal to the arbitrator circuit. Then, the bus is released in accordance therewith. In this way, the switching between the CPUs (the control of the occupation/relief of input/output I/F) is executed by reserving the bus use right.

SUMMARY OF THE INVENTION

It is therefore an object of the present invention to provide a processor where, even if one of a plurality of CPUs is inoperable, the process of the CPU can be executed by a different CPU.

In an aspect of the present invention, a processor includes a plurality of processing sections, each of which executes a predetermined process; a plurality of fault detecting circuits respectively provided for the plurality of processing sections, to detect a fault in one of the plurality of processing sections as a fault processing section to generate a fault detection signal; and a fault monitoring and control section configured to control a normal processing section as at least one of the plurality of processing sections other than the fault processing section to execute a relieving process in response to the fault detection signal.

Here, the relieving process may be determined based on a process load of the fault processing section, a process load of the normal processing section, and priority levels of processes to be executed by the fault processing section and the normal processing section.

In this case, the normal processing section may execute the process to be executed by the fault processing section in the relieving process. Also, the normal processing section may execute one of the process to be executed by the fault processing section and the process to be executed by the normal processing section in the relieving process based on the priority levels.

Also, the processor may further include a single input and output terminal; and a selector section connected with the plurality of processing sections and the input and output terminal and configured to connect the input and output terminal with the normal processing section in response to a selection control signal. The fault monitoring and control section may generate the selection control signal in response to the fault detection signal.

Also, each of the plurality of processing sections may include a CPU; a bus connected with the CPU; and at least one input/output interface connected with the bus. Each of the plurality of fault detecting circuits may include a first fault detecting circuit provided for the CPU; a second fault detecting circuit provided for the bus; and a third fault detecting circuit provided for the input/output interface.

Also, the fault monitoring and control section may include a detection signal decoder configured to decode the fault detection signal to generate a decoding resultant signal; and a storage section configured to store the decoding resultant signal. In this case, the processor may further include a terminal used to output the decoding resultant signal. Also, the fault monitoring and control section may further include an access section configured to access the storage section in response to a request from the normal processing section and to transmit a data of the fault processing section to the normal processing section.

Also, the processor may further include a register provided for each of the plurality of processing sections to hold a reset instruction and configured to output the set reset instruction to the fault processing section when the fault has occurred in a corresponding processing section.

Also, the processor may further include a plurality of clock signal generators respectively provided for the plurality of processing sections to generate a plurality of clock signals for the plurality of processing sections; and a voltage detecting circuit configured to detect that a power supply voltage is lower than a threshold value and to output the fault detection signal to the fault monitoring and control section. The fault monitoring and control section regards the processing section which operates in one of the plurality of clock signals which has a higher frequency, as the fault processing section, and the processing section which operates in one of the plurality of clock signals which has a lower frequency, as the normal processing section, when the detected power supply voltage is lower than the threshold value, and controls the normal processing section to execute the relieving process.

Also, in another aspect of the present invention, a method of controlling execution of processes by a processor comprising a plurality of processing sections, is achieved by detecting a fault in each of the plurality of processing sections as a fault processing section to generate a fault detection signal; and by controlling a normal processing section as at least one of the plurality of processing sections other than the fault processing section to execute a relieving process in response to the fault detection signal.

Here, the method may be achieved by further determining the relieving process based on a process load of the fault processing section, a process load of the normal processing section, and priority levels of processes to be executed by the fault processing section and the normal processing section.

Also, the controlling may be achieved by controlling the normal processing section to execute a process to be executed by the fault processing section in the relieving process.

Also, the controlling may be achieved by controlling the normal processing section to the normal processing section to execute one of a process to be executed by the fault processing section and a process to be executed by the normal processing section in the relieving process based on priority levels of the processes.

Also, the method may be achieved by further generating a selection control signal in response to the fault detection signal; and connecting an input and output terminal with the normal processing section in response to the selection control signal.

Also, the method may be achieved by further decoding the fault detection signal to generate a decoding resultant signal; storing the decoding resultant signal in a storage section; and outputting the decoding resultant signal from the storage section.

Also, the method may be achieved by further accessing the storage section in response to a request from the normal processing section; and transmitting a data of the fault processing section to the normal processing section.

Also, the method may be achieved by further setting a reset instruction in registers; and outputting the reset instruction to the fault processing section when the fault has occurred in a corresponding processing section.

Also, the detecting may be achieved by generating a plurality of clock signals for the plurality of processing sections; and by detecting that a power supply voltage is lower than a threshold value, to output the fault detection signal. The controlling may be achieved by regarding the processing section which operates in one of the plurality of clock signals which has a higher frequency, as the fault processing section, and the processing section which operates in one of the plurality of clock signals which has a lower frequency, as the normal processing section, when the detected power supply voltage is lower than the threshold value; and by controlling the normal processing section to execute the relieving process.

BRIEF DESCRIPTION OF THE DRAWINGS

FIGS. 10A and 10B are diagrams showing an example of a fault relieving process when a fault has occurred, in the present invention.

DESCRIPTION OF THE PREFERRED EMBODIMENTS

Hereinafter, a processor of the present invention will be described in detail with reference to the attached drawings. The processor of the present invention is attained as a semiconductor integrated circuit in one chip. Also, the present invention will be described by using as an example, a case where the processor is used in a control system. However, the present invention is not limited to such an application.

Figure 1:
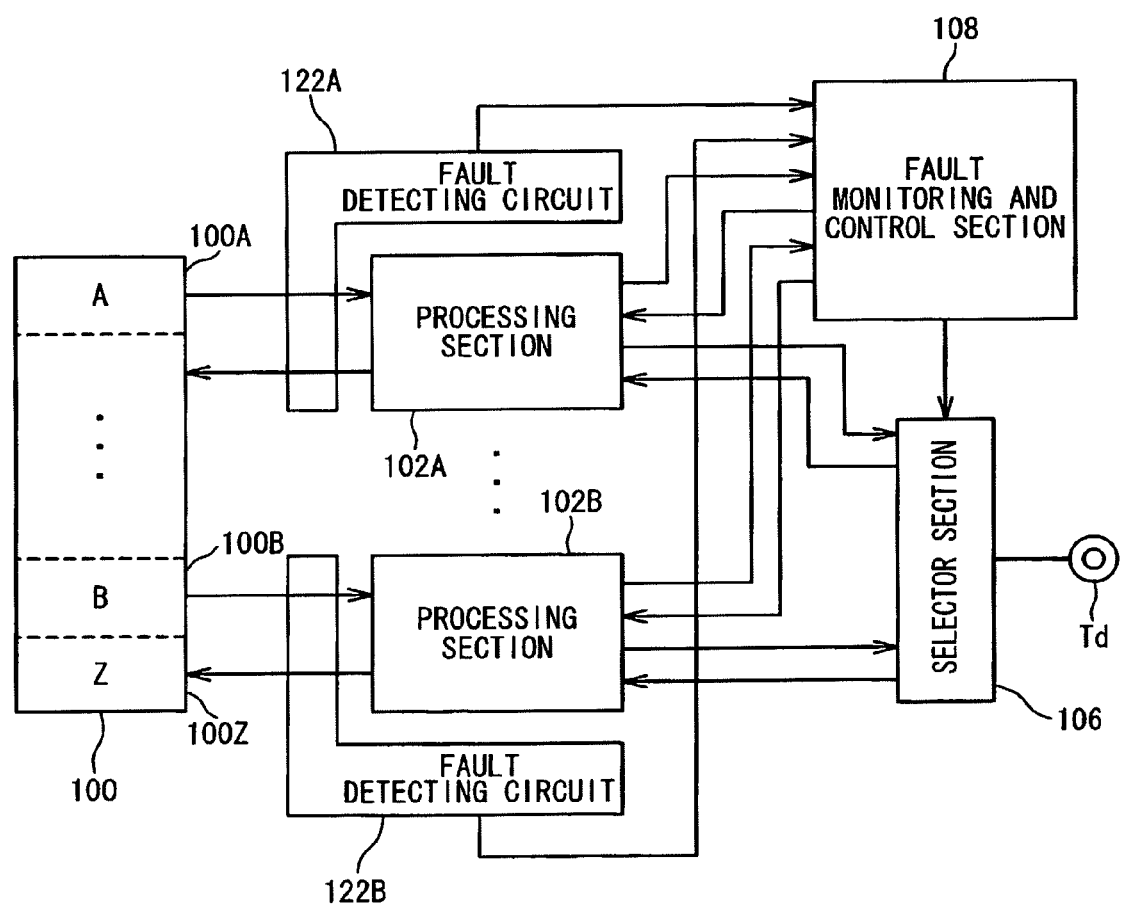
FIG. 1 is a block diagram showing a configuration of a processor according to a first embodiment of the present invention.

FIG. 1 is a block diagram showing the configuration of the processor according to the first embodiment of the present invention. With reference to FIG. 1, the processor in the first embodiment includes a memory 100, a plurality of processing sections 102A and 102B, a plurality of fault detecting circuits 122A and 122B, a fault monitoring and control section 108, and a selector section 106.

The memory 100 is shared by the plurality of processing sections 102A and 102B and has memory regions 100A and 100B which are respectively used for the plurality of processing sections 102A and 102B. Also, the memory 100 has a memory region 100Z to be commonly accessed by the plurality of processing sections 102A and 102B. Each of the memory regions 100A, 100B and 100Z stores process programs A and B and Z, respectively, and also stores the data to be used when the programs are executed.

The processing section 102A accesses the memory region 100A of the memory 100 and executes the process program A stored therein. Thus, a desired process is executed. The process includes at least one processing unit. The processing section 102A outputs a data related to the processing unit to the fault monitoring and control circuit 108 each time or the processing unit is completed. Also, the processing section 102A outputs a selection instruction to the fault monitoring and control circuit 108 so that an input/output terminal Td is connected to the processing section 102A through the selector section 106, when an external data from an external device is required for the process or when a process result is outputted to the external device. When a relieving process instruction is received from the fault monitoring and control section 108, the process program Z stored in the memory region 100Z is executed instead of the process program A stored in the memory region 100A. Also, the process program A may be executed. The processing section 102B operates similarly to the processing section 102A.

The fault detecting circuits 122A and 122B are provided for the processing sections 102A and 102B, respectively. Each of the fault detecting circuits 122A and 122B has a watch dog timer (not shown). The fault detecting circuit 122A monitors and detects a fault of the processing section 102A by using the watch dog timer and outputs an error detection signal to the fault monitoring and control circuit 108. Similarly, the fault detecting circuit 122B monitors and detects a fault of the processing section 102B and outputs the error detection signal to the fault monitoring and control circuit 108.

The selector section 106 is connected to a single input/output terminal TD, and connects the input/output terminal Td to one of the processing section 102A and processing section 102B in response to a selection control signal from the fault monitoring and control circuit 108.

The fault monitoring and control circuit 108 generates the selection control signal in accordance with the selection instruction from each of the processing sections 102A and 102B and outputs to the selector section 106. Thus, the input/output terminal Td is connected through the selector section 106 to the processing section 102A or 102B. Also, the fault monitoring and control circuit 108 detects the fault of any of the processing sections 102A and 102B in accordance with the error detection signal from the fault detecting circuit 122A or 122B and generates the selection control signal so that the input/output terminal Td is forced to be connected to the normal processing section. Also, the fault monitoring and control circuit 108 outputs the relieving process instruction to the normal processing section in response to the error detection signal. Also, for each completion of a predetermined processing unit, the fault monitoring and control circuit 108 receives the data related to the processing unit from each of the processing sections 102A and 102B. The fault monitoring and control circuit 108 can know what of the processing units is completed in each processor, based on this data.

Figure 2:
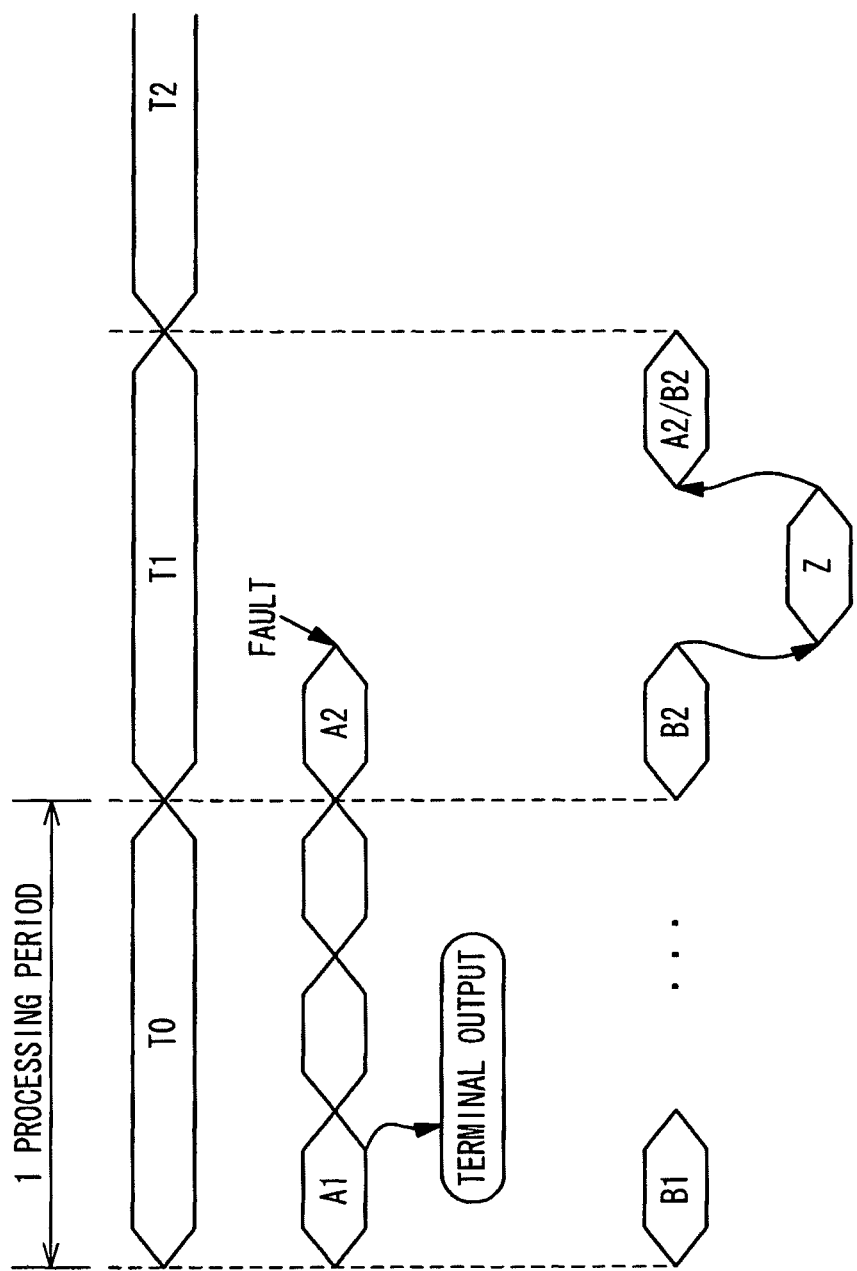
FIGS. 2A to 2C are timing charts showing an operation of the processor according to the first embodiment of the present invention.

The operation of the processor according to the first embodiment of the present invention will be described below with reference to FIG. 2. At first, the processing sections 102A and 102B are activated to start executing the process programs A and B stored in the memory regions 100A and 100B, respectively. It is supposed that the process of the process program A and the process of the process program B are different. For example, the process of the process program A is a control of an external device (not shown) and the process of the process program B is a calculating process. Also, it is supposed that the processing sections 102A and 102B progresses execution of the process programs A and B in a predetermined process cycle. Moreover, it is supposed that the process program A includes a plurality of processing units A1, . . . , A2, . . . , and the process program B includes a plurality of processing units B1, . . . , B2, . . . . Here, in the processing unit A1, the process result is assumed to be outputted through the input/output terminal Td.

The processing section 102A executes the process program A and completes the processing unit A1, and then outputs a selection instruction to the fault monitoring and control circuit 108. The fault monitoring and control circuit 108 outputs the selection control signal to the selector section 106 in response to the selection instruction. As a result, the input/output terminal Td is connected through the selector section 106 to the processing section 102A. The processing section 102A outputs the process result of the processing unit A1 through the selector section 106 and the input/output terminal Td to the external device. At the same time, the processing section 102A outputs the data related to the processing unit A1 to the fault monitoring and control circuit 108. Thus, the fault monitoring and control circuit 108 can know the completion of the processing unit A1. The processing section 102B similarly executes the processing unit B1.

Thereafter, it is supposed that the process in a process cycle T0 is completed and the control advances to the process in a process cycle T1. At this time, the processing section 102A starts the process of the processing unit A2. Also, the processing section 102B starts the process of the processing unit B2. At this time, when detecting an error of the processing section 102A, the fault detecting circuit 122A outputs the error detection signal to the fault monitoring and control circuit 108. The fault monitoring and control circuit 108 outputs the relieving process instruction to the processing section 102B in response to the error detection signal. In addition, the fault monitoring and control circuit 108 sends a progress state data, namely, the data related to the processing unit A2 in this example to the processing section 102B to indicate what of the processing units has been completed. The processing section 102B interrupts the processing unit B2 in the process program B and executes a relieving process program Z and then starts a relieving process.

FIG. 10A shows processing capacities of a CPU 1 and a CPU 2 included in the processing sections 102A and 102B. In a normal case, when the times assigned to the CPUs 1 and CPU 2 are T, the CPU 1 and CPU 2 execute the process programs A and B within a time of T/2 at the processing capacities of 100%. At this time, if a fault has occurred in the process of the CPU 2 and the process of the CPU 2 must be executed by the CPU 1, the CPU 1 can execute both of the process programs A and B within the time T, as shown in FIG. 10B.

Figure 11B:
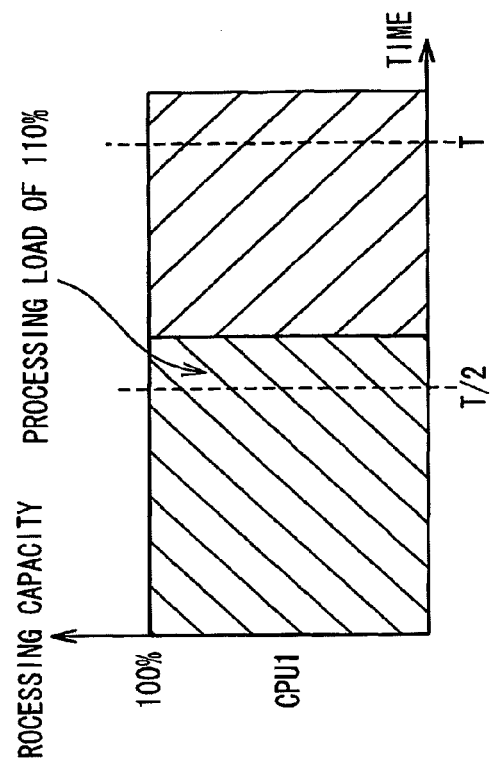
FIGS. 11A and 11B are diagrams showing another example of the fault relieving process when the fault has occurred, in the present invention.
Figure 11A:
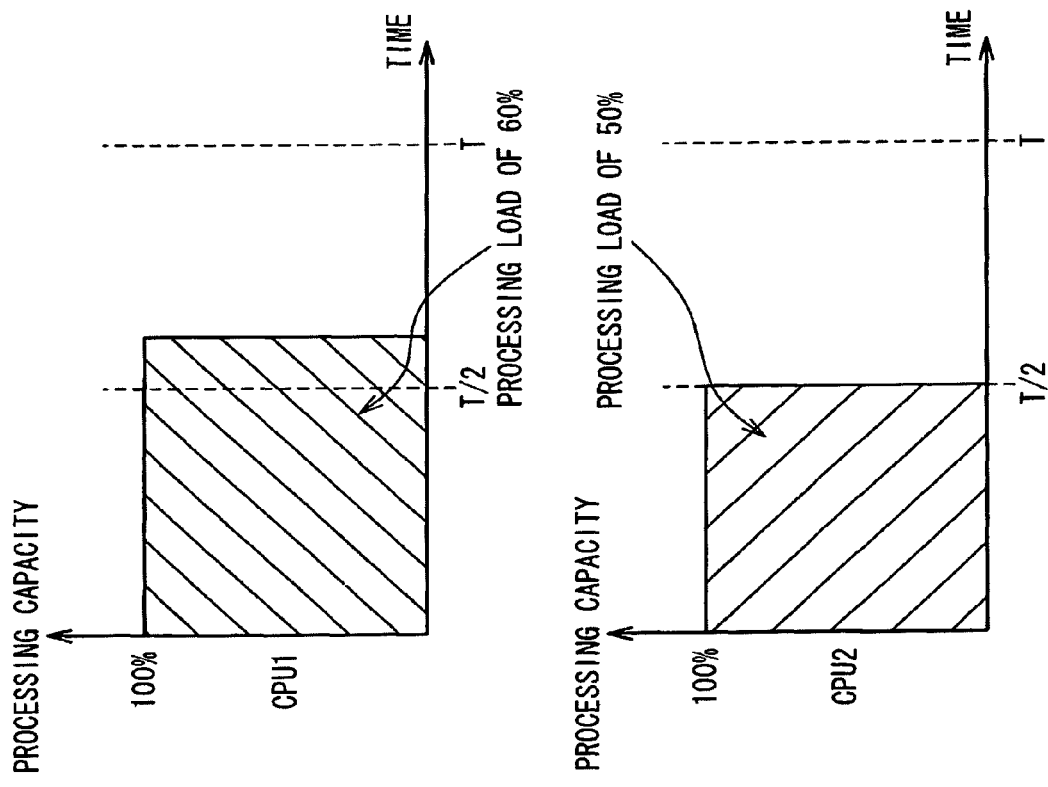

On the other hand, FIG. 11A shows the processing capacities of the CPU 1 and the CPU 2 included in the processing sections 102A and 102B. As shown in FIG. 11A, in a normal case, when the times assigned to the CPU 1 and CPU 2 are T, the CPU 1 and CPU 2 execute the process programs A and B within a time longer than the time T/2, and a time of T/2 in the processing capacities of 100%. At this time, if a fault has occurred in the CPU 2 and the process of the CPU 2 must be executed by the CPU 1, the CPU 1 cannot execute both of the process programs A and B within the time of T, as shown in FIG. 11B. In such a case, some countermeasures are required such as a method in which the CPU 1 executes only the process program A or only the process program B or other methods.

In the relieving process, the importance/emergency of the processing unit A1 is determined. When the processing unit A1 is executed and the control is advanced, there is a case that a control system should be immediately stopped because of fault occurrence. Also, there is also a case that the subsequent processing unit A2 must be executed. In such a case, the entire control system cannot be stopped because of the fault in one processor. Next, the processing section 102B determines a processing load of the processing section 102A and a processing load of the processing section 102B. For example, if the processing load of the processing section 102A before the fault occurrence is 70% and the processing load of the processing section 102B is 30%, the processing section 102B can execute both of the process of the program A and the process of the program B. However, if the processing load of the processing section 102A before the fault occurrence is 80% and the processing load of the processing section 102B is 50%, the processing section 102B cannot execute both of the processes of the programs A and B. In such a case, which of the processes should be executed is determined in accordance with the importance/emergency of the process of the program A and the process of the program B (the processing unit A2, . . . and the processing unit B2, . . . ).

Figure 3:
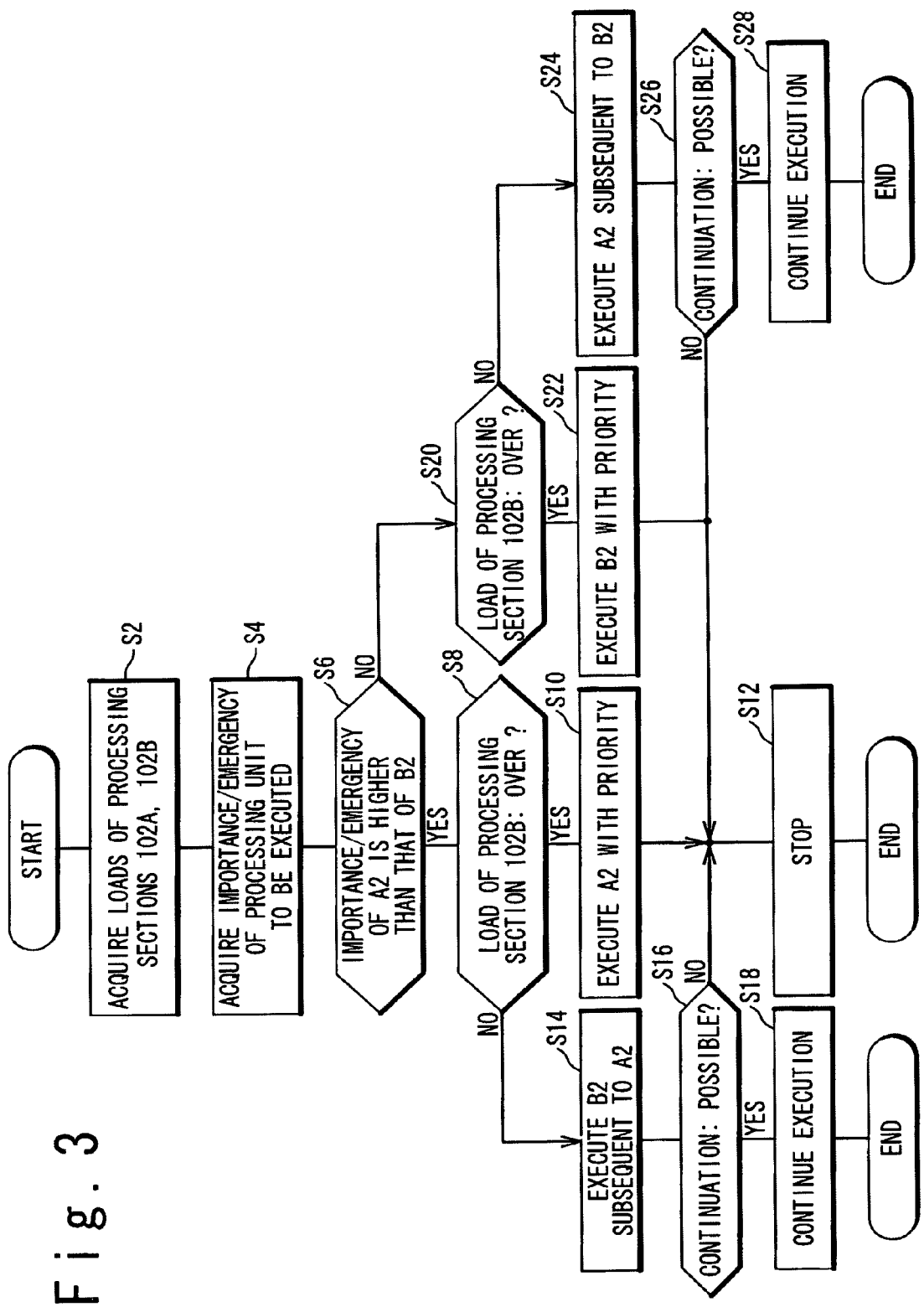
FIG. 3 is a flow chart showing an operation of the processor according to the first embodiment of the present invention.

FIG. 3 is a flowchart showing the reliving process based on the process program Z. With reference to FIG. 3, at a step S2, the processing section 102B acquires the loads of the processing sections 102A and 102B to be expected after the fault occurrence. The load of the processing section 102A can be determined from the progress state data sent from the fault monitoring and control circuit 108 to indicate what processing unit has been completed, and the processing unit described in the process program A. Also, the load of the processing section 102B can be determined from the processing unit of the process program B in accordance with the process state at the time of the fault occurrence. At this time, if the load of each processing unit is calculated in advance and held in a table (not shown) in the memory region 100Z, it is possible to reduce the time required to calculate the load.

Next, the processing section 102B determines the importance/emergency for each processing unit of the process programs A and B. For this purpose, it is adequate to prepare the table (not shown) in the memory region 100Z in which a priority level is assigned in advance to each processing unit for the process programs A and B. This is because the processing unit contains an accessory processing unit. Since such a processing unit is not required to reserve the safety of the control system, its priority level is low. On the other hand, there is a case where, although the control process is advanced to the middle, the control is insatiable in that state and it must be advanced to a predetermined stable state, or a case that it must be returned to the stable state. For this reason, for example, the priority level of the process required to reserve the safety becomes high.

From the above reasons, at a step S6, whether or not the importance/emergency (priority) of the processing unit A2 is higher than that of the processing unit B2 is determined. If the importance/emergency (priority) of the processing unit A2 is higher, a step S8 is executed. Then, whether or not the load becomes over 100% is determined when the processing unit A2 is executed by the processing section 102B in addition to the processing unit to be originally executed. If the load is not over 100%, the processing unit A2 is executed at a step S14, and then the processing unit B2 is executed. When the processing unit A2 has been completed, the processing section 102B outputs the process result of the processing unit A2 through the selector section 106 and the input/output terminal Td to the external device. At the same time, the processing section 102B outputs a data related to the processing unit A2 to the fault monitoring and control circuit 108. Thus, the fault monitoring and control circuit 108 can know the completion of the processing unit A2. At this time, by the fault monitoring and control circuit 108, the input/output terminal Td is already connected through the selector section 106 to the processing section 102B. Therefore, the processing section 102B is not required to output the selection instruction to the fault monitoring and control circuit 108.

Thereafter, whether or not the continuation of the process is possible is determined at a step S16. If the continuation is possible, the process is continued at a step S18. Also, if the continuation of the process is impossible, a step S12 is executed to stop the control process.

Also, if the load is determined to be over 100%, the processing unit A2 is executed at a step S10. Thus, the safety is reserved. After that, the step S12 is executed to stop the control process.

Also, if the importance/emergency of the processing unit A2 is low, whether or not the load is over 100% is determined at a step S20 when the processing section 102B executes the processing unit A2 in addition to the processing unit B2 to be originally executed. If the load is over 100%, the processing unit B2 is executed at a step S22. After that, the step S12 is executed to stop the control process.

Also, if the load is determined not to be over 100% at the step S20, a step S24 is executed. At the step S24, the processing unit B2 is executed, and then the processing unit A2 is executed. When the process of the processing unit A2 has been completed, the processing section 102B outputs the process result of the processing unit A2 through the selector section 106 and the input/output terminal Td to the external device. At the same time, the processing section 102B outputs the data related to the processing unit A2 to the fault monitoring and control circuit 108. Thus, the fault monitoring and control circuit 108 can know the completion of the processing unit A2. At this time, by the fault monitoring and control circuit 108, the input/output terminal Td is already connected through the selector section 106 to the processing section 102B. Therefore, the processing section 102B is not required to output the selection instruction to the fault monitoring and control circuit 108.

Next, whether or not the continuation of the process is possible is determined at a step S26. If the continuation is possible, the process is continued at a step S28. Also, if the continuation of the process is impossible, a step S22 is executed to stop the control process.

In this way, the processing section 102B removes some of the processing units of the process programs A and B and can consequently advance the processes of the process programs A and B by using its usable processing performance.

In the above-mentioned example, since the process period is defined, the processing units are required to be completed by the processing sections 102A and 102B within the process period. However, if the process period is not defined, the processing section 102B may execute the process programs A and B although the process time is necessary.

Also, in the above-mentioned example, the processing sections 102A and 102B output the selection instruction to the fault monitoring and control circuit 108 to control the selector section 106. However, when the input/output terminal Td is always connected to the processing section 102A, if it is only required to be connected to the processing section 102B at the time of an error, the processing sections 102A and 102B are not required to output the selection instruction to the fault monitoring and control circuit 108.

The processing sections 102A and 102B send the data related to the processing unit to the fault monitoring and control circuit 108 for each completion of the processing unit. However, for example, the processing section 102A may directly send the data related to the processing unit to the processing section 102B. Or, thee data may be written to the table (not shown) in the memory region 100Z. In any of the cases, the processing sections 102A and 102B are not required to send the data related to the processing unit to the fault monitoring and control circuit 108, for each completion of the processing unit.

Also, in the above-mentioned example, the single input/output terminal Td is connected through the selector section 106 to the processing sections 102A and 102B. However, a plurality of input/output terminals (not shown) may be designed to be connected to the processing sections 102A and 102B, respectively. In that case, the selector section 106 is not required, and the processes of the fault monitoring and control circuit 108 in association therewith are not required.

Figure 4:
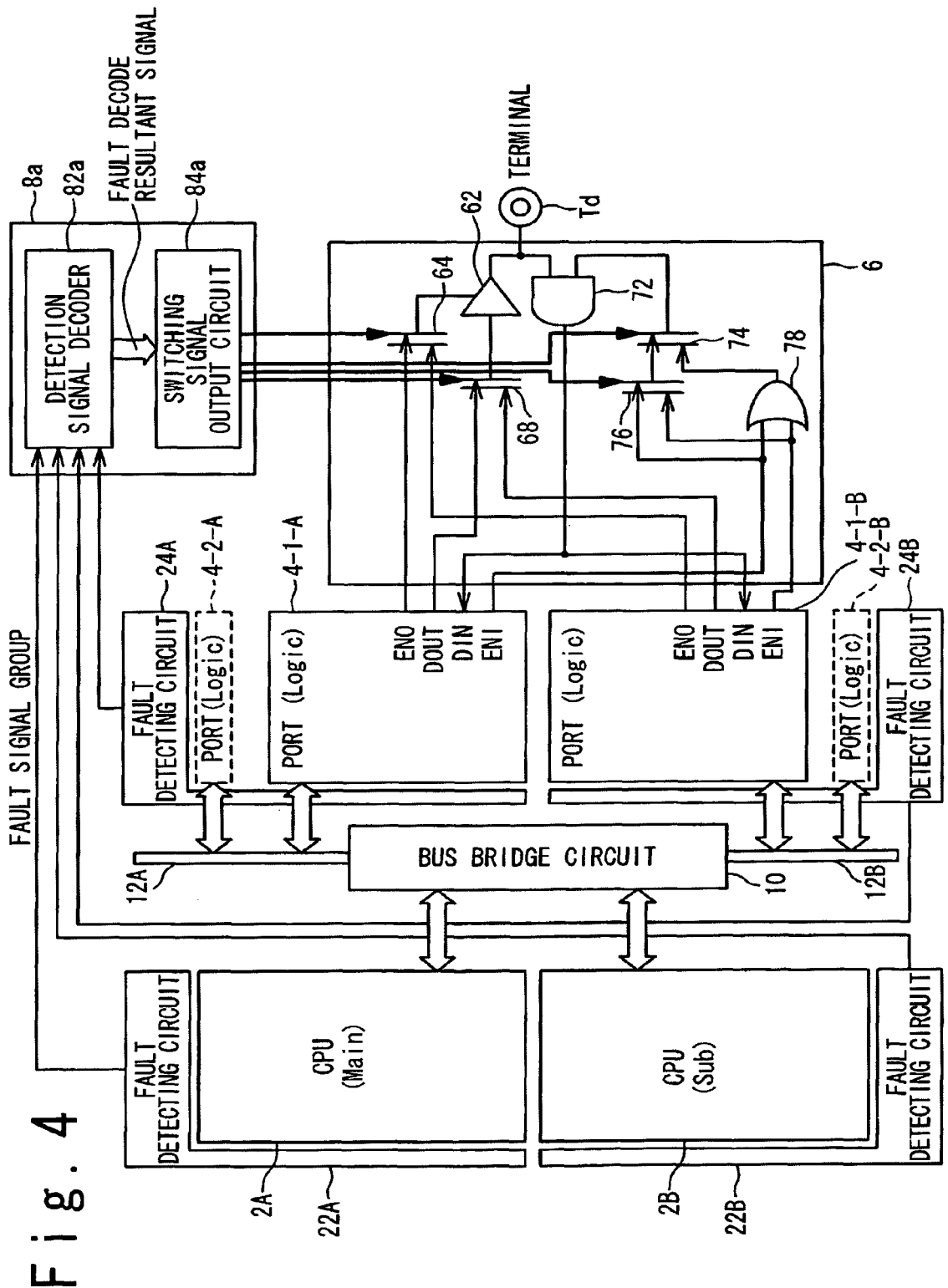
FIG. 4 is a block diagram showing the configuration of the processor according to a second embodiment of the present invention.

A processor according to the second embodiment of the present invention will be described below with reference to FIG. 4. Attention should be paid to the fact that the memory 100 is not shown in FIG. 4. Also, in the processor according to the second embodiment, the number of the processors is 2.

The processor in the second embodiment includes CPU 2A and CPU 2B, error detecting circuits 22A and 22B, buses 12A and 12B, a bus bridge circuit 10, input/output ports 4-1-A, 4-2-A, 4-1-B and 4-2-B, error detecting circuits 24A and 24B, a selector section 6 and an fault monitoring and control circuit 8a. Here, the fault monitoring and control circuit 8a corresponds to the fault monitoring and control circuit 108 in the first embodiment, and the selector section 6 corresponds to the selector section 106 in the first embodiment. In the following embodiment, although the fault monitoring and control circuits are referred to as 8a, 8b, 8c, 8d, 8e and 8f, they are similar. The error detecting circuits 22A and 24A correspond to the fault detecting circuit 122A in the first embodiment, and the error detecting circuits 22B and 24B correspond to the fault detecting circuit 122B in the first embodiment. Also, the CPU 2A, the bus 12A, the bus bridge circuit 10 and the input/output ports 4-1-A, 4-2-A correspond to the processing section 102A in the first embodiment, and the CPU 2B, the bus 12B, the bus bridge circuit 10 and the input/output ports 4-1-B, 4-2-B correspond to the processing section 102B in the first embodiment. Also, FIG. 4 does not show a signal line for the relieving process instruction from the fault monitoring and control circuit 8a to the CPU 2A and CPU 2B; a signal line for the selection instruction from the CPU 2A and CPU 2B to the fault monitoring and control circuit 8a; and a signal line for the data related to the processing unit when the processing unit has been completed.

The CPU 2A and CPU 2B execute the process programs A and B stored in the memory (not shown), respectively. The error detecting circuits 22A and 22B are provided for the CPU 2A and CPU 2B, respectively. Each of the error detecting circuits 22A and 22B has a watch dog timer and monitors the error of the corresponding CPU. When the error is detected, the error detection signal is outputted to the fault monitoring and control circuit 8a.

The error detecting circuit 24A is provided for the input/output ports 4-1-A and 4-2-A, and the error detecting circuit 24B is provided for the input/output ports 4-1-B and 4-2-B. Each of the error detecting circuits 24A and 24B determines that the state in which a fixed value is always outputted from each input/output port is an error (fault) state, and then outputs the error detection signal to the fault monitoring and control circuit 8a.

The input/output ports 4-1-A and 4-2-A are connected to the bus 12A, and the input/output ports 4-1-B and 4-2-B are connected to the bus 12B. The bus bridge circuit 10 connects the buses 12A and 12B and is connected to the CPU 2A and CPU 2B. Thus, the input/output ports 4-1-A and 4-2-A and the input/output ports 4-1-B and 4-2-B are connected to the CPU 2A and CPU 2B.

The selector section 6 has a buffer driver 62, an AND gate 72, an OR gate 78, selectors 64, 68, 74 and 76. Input enable signals ENI of the input/output ports 4-1-A and 4-1-B are connected to an input of the OR gate 78 and an input of the selector 76. An output of the selector 76 and an output of the OR gate 78 are connected to inputs of the selector 74. An output of the selector 74 is connected to one input of the AND gate 72. An input/output terminal Td is connected to the other input of the AND gate 72. An output of the AND gate 72 is connected to data inputs DIN of the input/output ports 4-1-A and 4-1-B. Output enable signals ENO of the input/output ports 4-1-A and 4-1-B are connected to inputs of the selector section 64. An output of the selector section 64 is connected to a control terminal of the buffer driver 62. Data outputs DOUT of the input/output ports 4-1-A and 4-1-B are connected to inputs of the selector section 68. An output of the selector section 68 is connected to an input of the buffer driver 62, and an output of the buffer driver 62 is connected to the input/output terminal Td. A selection control signal is sent from the fault monitoring and control circuit 8a to each of the selectors 64, 68, 74 and 76. As mentioned above, the input/output terminal Td is connected to the input/output port 4-1-A in the normal state and connected to the input/output port 4-1-B in the fault state.

The fault monitoring and control circuit 8a has a detection signal decoder 82a and a switching signal output circuit 84a. The detection signal decoder 82a decodes the error detection signals from the error detecting circuits 22A and 22B, 24A and 24B, generates a fault decode resultant signal and outputs to the switching signal output circuit 84a. The switching signal output circuit 84a outputs the selection control signal to the selector section 6 in response to the fault decode resultant signal.

The operation of the processor according to the second embodiment is similar to that of the processor in the first embodiment. Thus, their explanations are omitted.

Figure 5:
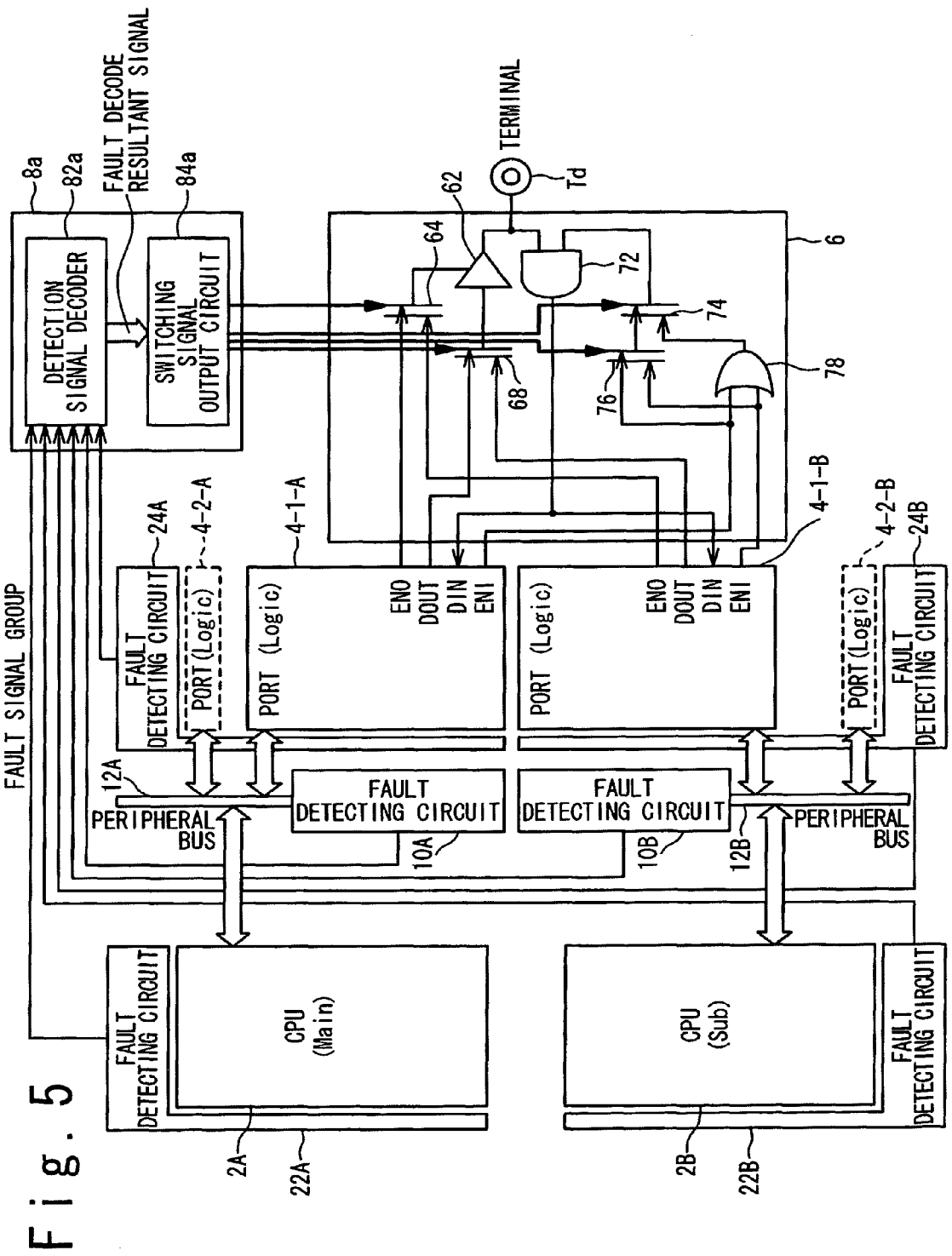
FIG. 5 is a block diagram showing the configuration of the processor according to a third embodiment of the present invention.

A processor according to the third embodiment of the present invention will be described below with reference to FIG. 5. The processor in the third embodiment is similar to the processor according to the second embodiment. The processor in the third embodiment is different from the processor in the second embodiment in that instead of the buses 12A and 12B and the bus bridge circuit 10, only the buses 12A and 12B are used and error detecting circuits 10A and 10B are provided for them, respectively. When a bus error has occurred, the data cannot be received by and outputted from the CPU. For this reason, the error detecting circuits 10A and 10B are provided. The error detecting circuits 10A and 10B, for example, if the data on the bus is always at "1" or "0", determines the bus as the error and outputs the error detection signal to the fault monitoring and control circuit 8b. The fault monitoring and control circuit 8b is similar in configuration and operation to the fault monitoring and control circuit 8a.

The operation of the processor according to the third embodiment is similar to that of the processor in the first embodiment. Thus, their explanations are omitted.

Figure 6:
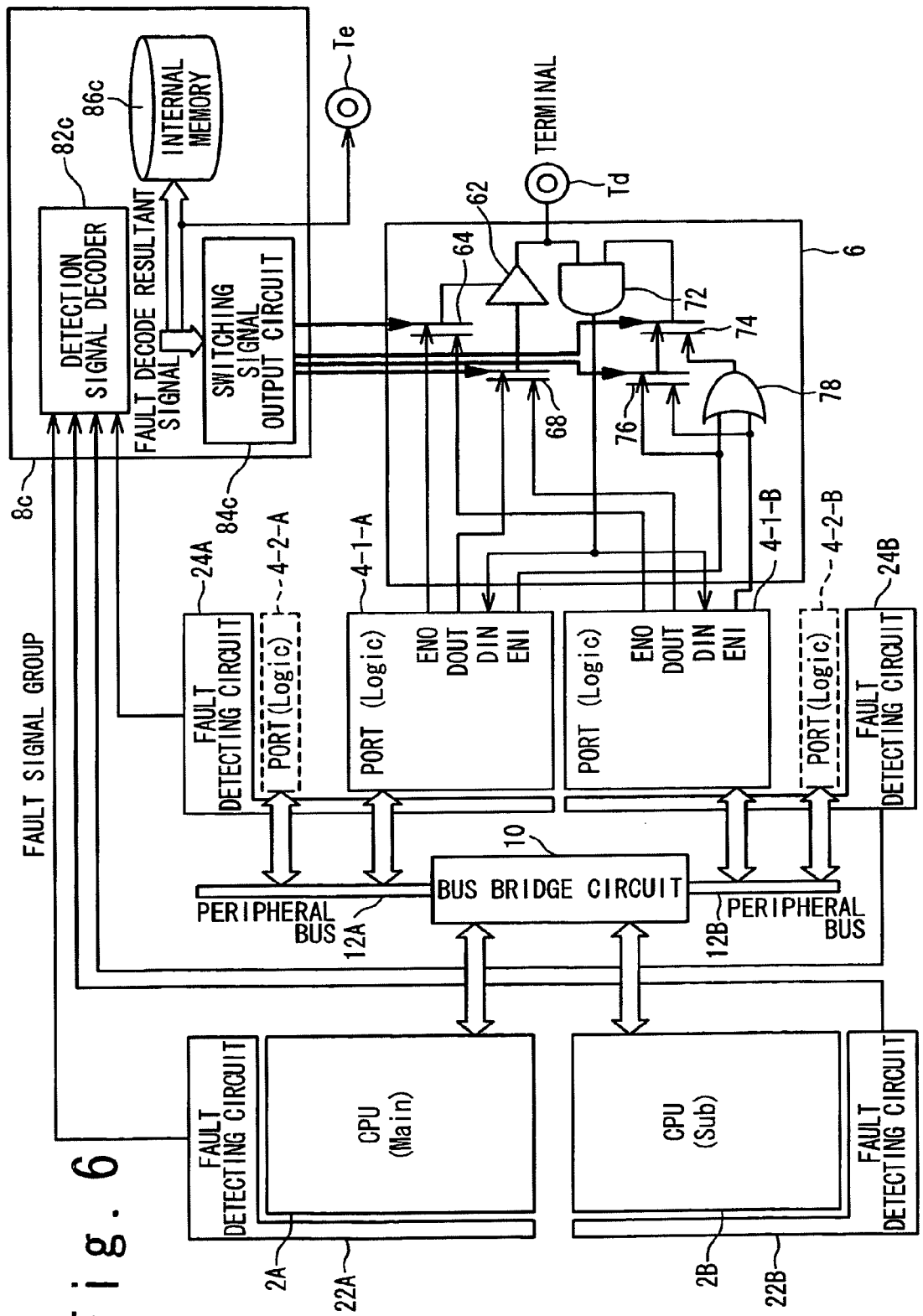
FIG. 6 is a block diagram showing the configuration of the processor according to a fourth embodiment of the present invention.

A processor according to a fourth embodiment of the present invention will be described below with reference to FIG. 6. The processor according to the fourth embodiment is similar to the processor according to the second embodiment. The processor according to the fourth embodiment is different from the processor according to the second embodiment in configuration and operation of a fault monitoring and control circuit 8c. In the fourth embodiment, the fault monitoring and control circuit 8c has a detection signal decoder 82c, a switching signal output circuit 84c and an internal memory 86c. The detection signal decoder 82c decodes the error detection signals from the error detecting circuits 22A and 22B, 24A and 24B, generates the fault decode resultant signal and outputs to the switching signal output circuit 84a. The switching signal output circuit 84a outputs the selection control signal to the selector section 6 in response to the fault decode resultant signal. The internal memory 86c stores the fault decode resultant signal. Consequently, when the fault will be later analyzed, it is possible to quickly determine the occurrence position of the error by examining the data stored in the internal memory 86c. Also, the fault decode resultant signal is outputted from an output terminal Te to the external device. The external device can know the occurrence of the error in the processor by monitoring and detecting the signal of the output terminal Te.

The operation of the processor according to the fourth embodiment is similar to that of the first embodiment. Thus, their explanations are omitted.

Figure 7:
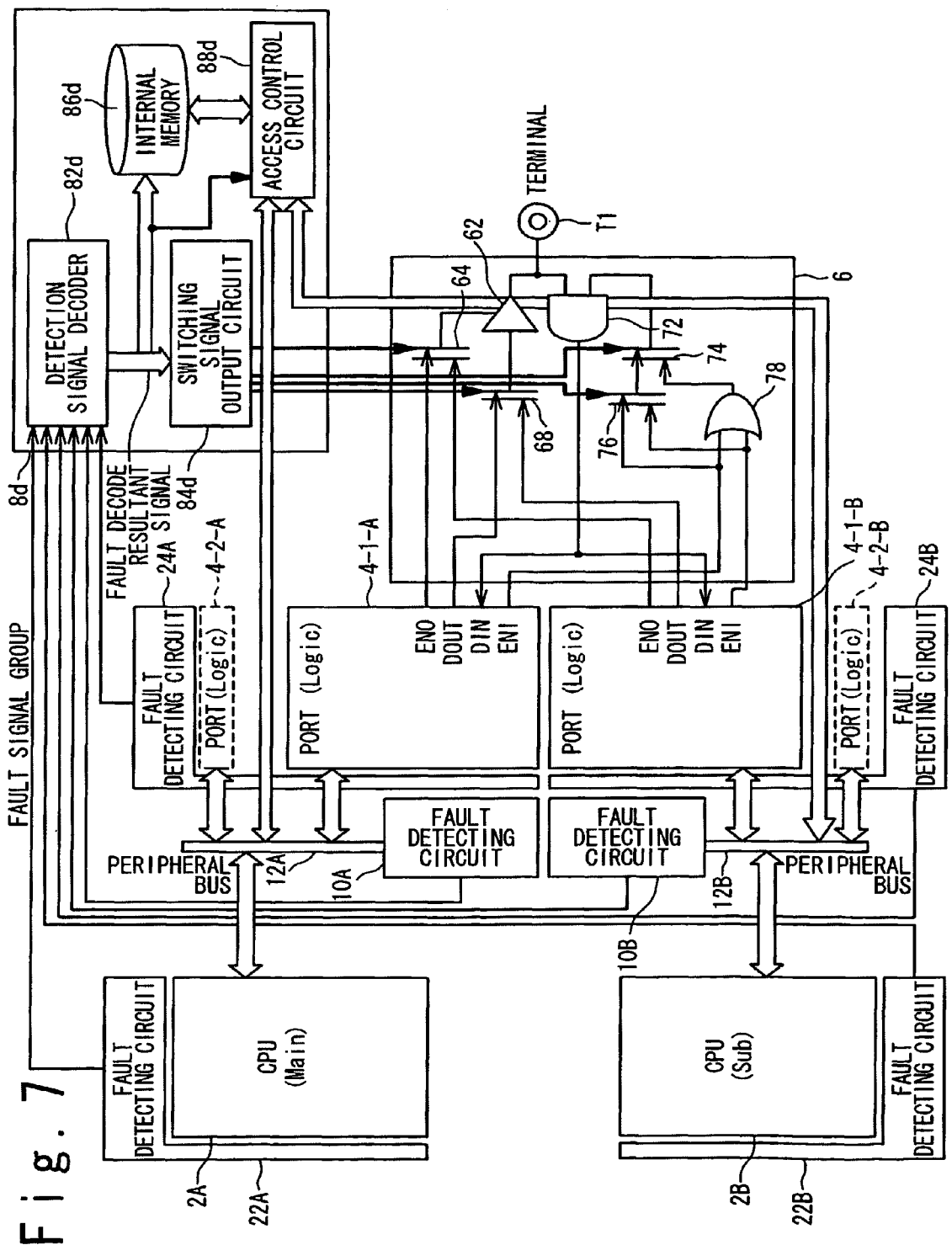
FIG. 7 is a block diagram showing the configuration of the processor according to a fifth embodiment of the present invention.

The processor according to the fifth embodiment of the present invention will be described below with reference to FIG. 7. The processor according to the fifth embodiment is similar to the processor according to the third embodiment. The processor according to the fifth embodiment is different from the processor according to the third embodiment in configuration and operation of a fault monitoring and control circuit 8d. In the fifth embodiment, the fault monitoring and control circuit 8d has a detection signal decoder 82d, a switching signal output circuit 84d, an internal memory 86d and an access control circuit 88d. The detection signal decoder 82d decodes the error detection signals from the error detecting circuits 22A and 22B, 24A and 24B, 10A and 10B, generates the fault decode resultant signal and outputs to the switching signal output circuit 84d, the internal memory 86d and the access control circuit 88d. The switching signal output circuit 84d outputs the selection control signal to the selector section 6 in response to the fault decode resultant signal. The internal memory 86d stores the fault decode resultant signal. Consequently, when the error will be later analyzed, it is possible to quickly determine the occurrence position of the error by examining the data stored in the internal memory 86d. Also, the fault decode resultant signal is outputted to the access control circuit 88d. The access control circuit 88d is connected to the buses 12A and 12B. The CPU 2A and CPU 2B can access the access control circuit 88d through the buses 12A and 12B. The access control circuit 88d reads the data from the internal memory 86d in accordance with a command from the CPU 2A and CPU 2B, and outputs to a command issuing source. However, the access control circuit 88d rejects the access from the CPU on the error occurrence side in accordance with the fault decode resultant signal from the detection signal decoder 82d. When the CPU on the normal side executes the relieving process in response to the relieving process instruction, the necessary data can be extracted from the internal memory 86d.

The other operation of the processor according to the fifth embodiment is similar to that of the processor in the first embodiment. Thus, their explanations are omitted.

Figure 8:
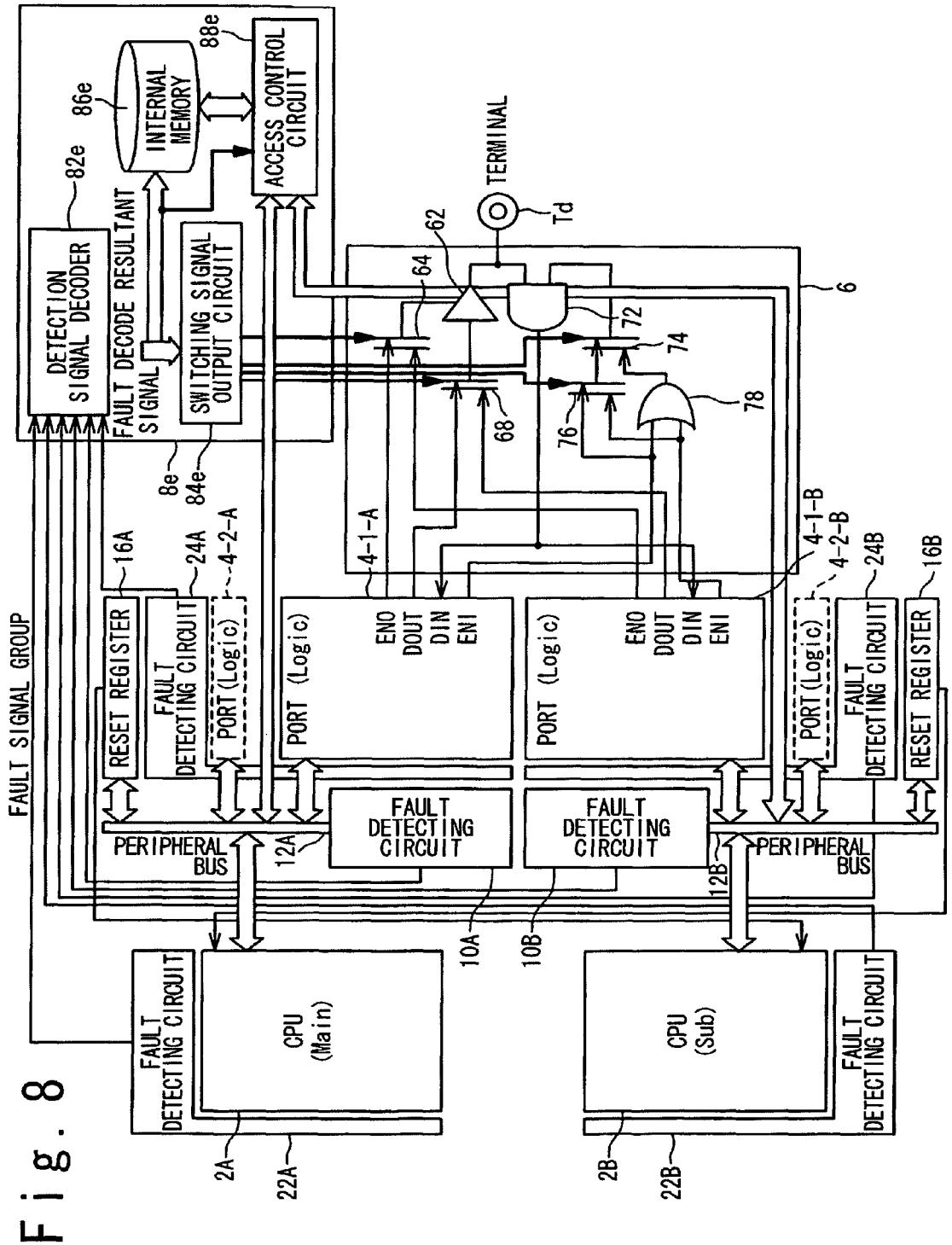
FIG. 8 is a block diagram showing the configuration of the processor according to a sixth embodiment of the present invention.

The processor according to the sixth embodiment of the present invention will be described below with reference to FIG. 8. The processor according to the sixth embodiment is similar to the processor according to the fifth embodiment. The processor according to the sixth embodiment is different from the processor according to the fifth embodiment in that RESET registers 16A and 16B are provided to be connected to the buses 12A and 12B. The CPU 2A sets a reset command in the RESET register 16A through the bus 12A, and the CPU 2B is reset by this reset command. Also, the CPU 2B sets the reset command in the RESET register 16B through the bus 12B, and the CPU 2A is reset by this reset command. In this way, for example, when the CPU 2A is frozen, the CPU 2B responds to the relieving process instruction from a fault monitoring and control circuit 8e and sets the reset command in the register 16B and then resets the CPU 2A. Consequently, the operation of the CPU 2A is expected to be returned, and the CPU 2A may be returned to the normal operation.

The other operation of the processor according to the sixth embodiment is similar to that of the processor in the first embodiment. Thus, their explanations are omitted.

Figure 9:
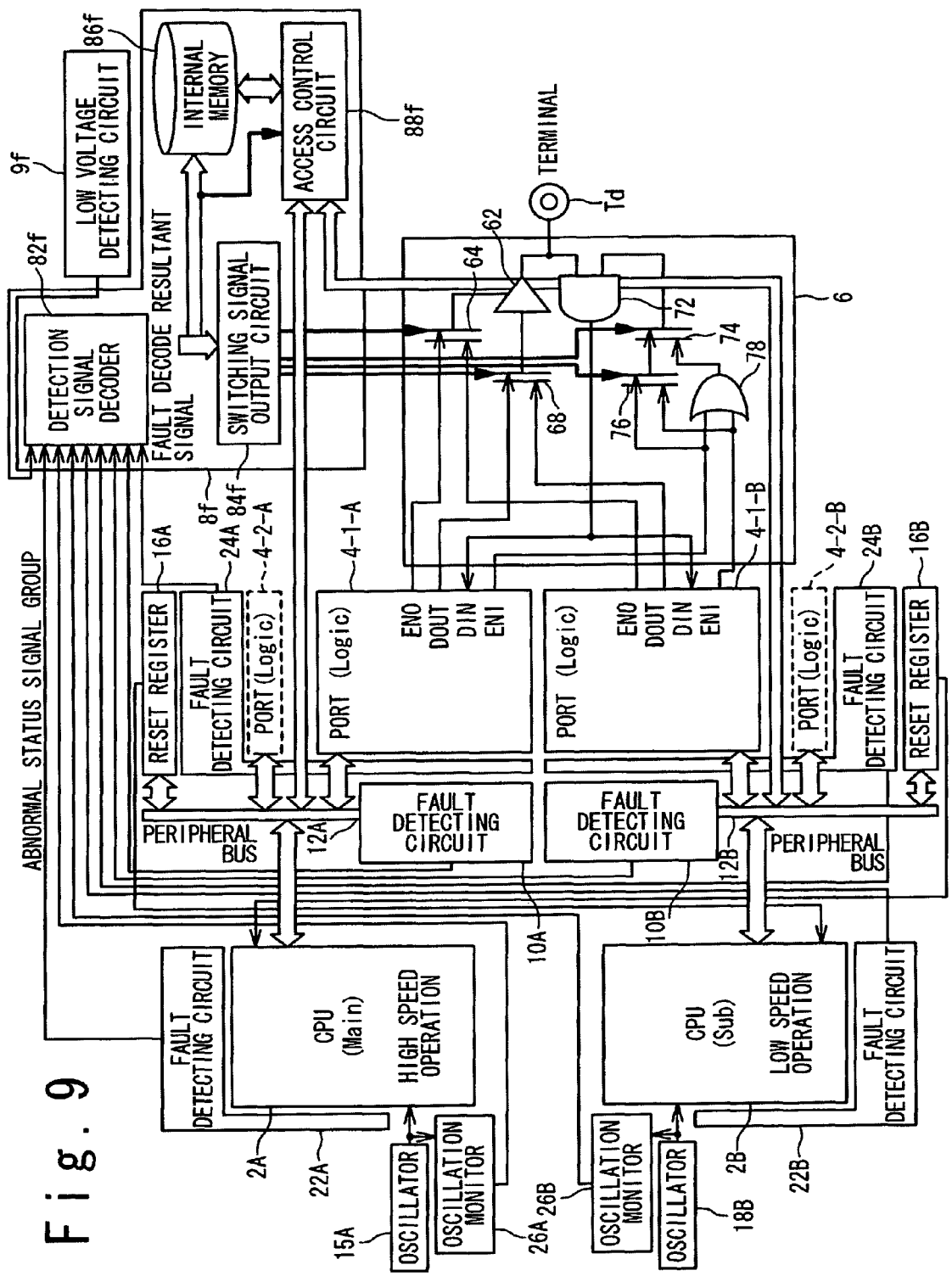
FIG. 9 is a block diagram showing the configuration of the processor according to a seventh embodiment of the present invention.

The processor according to the seventh embodiment of the present invention will be described below with reference to FIG. 9. The processor according to the seventh embodiment is similar to the processor according to the sixth embodiment.

The processor according to the seventh embodiment is different from the processor according to the sixth embodiment in the following manner. That is, an oscillator 15A generates a clock signal with a high frequency and sends to the CPU 2A. The CPU 2A operates in synchronization with the clock signal with the high frequency. An oscillation monitoring circuit 26A is provided for this oscillator 15A, and when detecting an oscillation error, outputs the error detection signal to a fault monitoring and control circuit 8f. Also, an oscillator 15B generates a clock signal with a low frequency and sends to the CPU 2B. The CPU 2B operates in synchronization with the clock signal of the low frequency. An oscillation monitoring circuit 26B is provided for this oscillator 15B and when detecting the oscillation error, outputs the error detection signal to the fault monitoring and control circuit 8f. Also, a low voltage detecting circuit 9f is provided for a power source (not shown). Then, when a power source voltage becomes lower than a predetermined level, the error detection signal is outputted to the fault monitoring and control circuit 8f. When the error detection signal is received from the low voltage detecting circuit 9f, the fault monitoring and control circuit 8f outputs the relieving process instruction to the CPU 2B. Instead of the CPU 2A, the CPU 2B executes the process program A. In this way, before the power source voltage becomes lower than an operable voltage, the necessary process can be executed.

The other operation of the processor according to the sixth embodiment is similar to that of the processor in the first embodiment. Thus, their explanations are omitted.

As mentioned above, according to the present invention, depending on the control target, even if one of the plurality of CPUs is inoperable, the minimum process can be executed until the safety is reserved. Also, even if the processing performance is reduced, the main process can continue to be executed.

Also, when the CPU issues a request signal to an arbitration circuit of the bus, the arbitration circuit executes a bus arbitration and gives a bus use right (grant signal) to the CPU. When the bus is opened, the CPU issues a completion signal to the arbitration circuit. Then, the bus is opened in accordance therewith. When the CPU reserves the use right of the bus, even if an error is caused not to allow the bus arbitration or the CPU switching, the process is executed by the CPU other than the CPU in which the error has occurred, or since the reset is performed, the down of the entire system is prevented in the present invention.

Also, in a semiconductor integrated circuit, the reduction in the number of the terminals is desired. In that case, conventionally, when a particular terminal is fixedly assigned to a particular CPU, and the error has occurred in the CPU, the other CPU cannot be connected to the terminal even if the other CPU tries to continue the process. Thus, the data cannot be obtained. However, according to the present invention, at the time of the error occurrence, the substitution CPU can obtain the data through the terminal and continue the process. In this way, the flexibility in use of the processor can be increased.

According to the present invention, in the multi-processor system, even if an error has occurred in any CPU, it is possible to avoid immediate system down. Also, it is possible to execute a minimum process to reserve safety. It is possible to continue a necessary process based on a load state. Also, even if the number of the terminals is decreased, the terminals are shared, which allows the signal to be transmitted to and received from an external device by the normal CPU, even when the error has occurred. Also, it is possible to design a flexible system configuration through the sharing.

What is claimed is:

1. A processor comprising:
   a first processing section;
   a second processing section;
   a controller that controls the first and second processing sections if a fault occurs; and
   a memory that is shared by the first and second processing sections, and that is configured to be accessed from the second processing section if the fault occurs in the first processing section,
   wherein
   the processor is a single chip processor,
   wherein the memory stores a first program for the first processing section and a second program for the second processing section,
   wherein the memory further stores a relieving program, the second processing section is interrupted and executes the relieving program when the fault occurs in the first processing section,
   wherein if the execution result of the relieving program indicates that a priority of the first program is higher than a priority of the second program, the second processing section executes the first program.

2. The processor according to claim 1, wherein
   if the execution result of the relieving program further indicates that the second processing section is able to execute the first program and the second program, the second processing section executes the second program after execution of the first program.

3. The processor according to claim 1, further comprising:
   a watchdog timer coupled to the first processing section, wherein the second processing section executes the relieving program when the watchdog timer indicates the fault in the first processing section.

4. The processor according to claim 1, further comprising:
   a voltage detector,
   wherein the first processing section operates at a first frequency,
   the second processing section operates at a second frequency that is lower than the first frequency, and
   the second processing section executes the relieving program when the voltage detector detects a voltage error.

5. A processor comprising:
   a first processing section;
   a second processing section;
   a controller that controls the first and second processing sections if a fault occurs; and
   a memory that is shared by the first and second processing sections, and that is configured to be accessed from the second processing section if the fault occurs in the first processing section,
   wherein the processor is a single chip processor,
   wherein the memory stores a first program for the first processing section and a second program for the second processing section,
   wherein the memory further stores a relieving program, the second processing section is interrupted and executes the relieving program when the fault occurs in the first processing section,
   wherein if the execution result of the relieving program indicates that a priority of the second program is higher than a priority of the first program, the second processing section executes the second program.

6. The processor according to claim 5, wherein
   if the execution result of the relieving program further indicates that the second processing section is able to execute the first program and the second program, the second processing section executes the first program after execution of the second program.

7. The processor according to claim 5, further comprising:
   a watchdog timer coupled to the first processing section, wherein the second processing section executes the relieving program when the watchdog timer indicates the fault in the first processing section.

8. The processor according to claim 5, further comprising:
   a voltage detector,
   wherein the first processing section operates at a first frequency,
   the second processing section operates at a second frequency that is lower than the first frequency, and
   the second processing section executes the relieving program when the voltage detector detects a voltage error.

9. A processor comprising:
   a first processing section;
   a second processing section; and
   a memory that is shared by the first and second processing sections, and that stores a first program for the first processing section and a second program for the second processing section,
   wherein when the fault occurs in the first processing section, the second processing section interrupts a running process for the second program and determines whether to execute either the first program or the second program, and
   the processor is a single chip processor.

10. The processor according to claim 9, wherein
    the second processing section determines whether to execute either the first program or the second program based on priorities of the first and second programs.

11. The processor according to claim 9, wherein
    the memory further stores a relieving program and the second processing section executes the relieving program to determine whether to execute either the first program or the second program.

12. The processor according to claim 11, wherein
    the relieving program is configured to determine one of the first program and the second program based on priorities of the first and second programs.

13. The processor according to claim 10, wherein
    when the priority of the first program is higher than the priority of the second program, the second processing section executes the first program.

14. The processor according to claim 10, wherein
    when the priority of the first program is higher than the priority of the second program and the second processing section is able to execute the first and second programs, the second processing section executes the second program after execution of the first program.

15. The processor according to claim 10, wherein
    when the priority of the second program is higher than the priority of the first program, the second processing section executes the second program.

16. The processor according to claim 10, wherein
    when the priority of the second program is higher than the priority of the first program and the second processing section is able to execute the first and second programs, the second processing section executes the first program after execution of the second program.

17. The processor according to claim 9, further comprising:
    a watchdog timer coupled to the first processing section, wherein the second processing section interrupts the running process for the second program and determines whether to execute either the first program or the second program when the watchdog timer indicates the fault in the first processing section.

\* \* \* \* \*

UNITED STATES PATENT AND TRADEMARK OFFICE
CERTIFICATE OF CORRECTION

PATENT NO. : 8,984,334 B2
APPLICATION NO. : 13/631272
DATED : March 17, 2015
INVENTOR(S) : Kazuhisa Fukuda It is certified that error appears in the above-identified patent and that said Letters Patent is hereby corrected as shown below:

Specification

Column 7, Line 24: Delete "insatiable" and insert -- instable --

Signed and Sealed this
Seventeenth Day of November, 2015

Michelle K. Lee
*Director of the United States Patent and Trademark Office*